US006792675B2

(12) United States Patent
Tran

(10) Patent No.: US 6,792,675 B2
(45) Date of Patent: Sep. 21, 2004

(54) APPARATUS FOR ALIGNING AND SOLDERING CONNECTORS TO A PRINTED BOARD

(75) Inventor: Camnhung T. Tran, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 198 days.

(21) Appl. No.: 10/050,406

(22) Filed: Jan. 15, 2002

(65) Prior Publication Data

US 2003/0134540 A1 Jul. 17, 2003

(51) Int. Cl.[7] .................................................. B23P 19/02

(52) U.S. Cl. ............................. 29/760; 29/759; 29/757; 29/761; 29/751; 29/739; 29/464; 269/903; 269/71; 439/637

(58) Field of Search ........................ 29/760, 759, 281.1, 29/281.4, 281.6, 861, 739, 741, 464, 751, 753, 757, 761; 269/71, 903, 902, 68, 67; 228/44.7, 43, 39, 37; 439/637, 493, 67, 62, 77

(56) References Cited

U.S. PATENT DOCUMENTS 5,649,357 A * 7/1997 Chapman et al. ............. 29/861
5,820,013 A * 10/1998 Ortiz ........................... 228/43
6,105,241 A * 8/2000 Ogle ........................... 29/760
6,237,832 B1 * 5/2001 Chung ........................ 228/44.7
2003/0134540 A1 * 7/2003 Tran ........................... 439/637

* cited by examiner

*Primary Examiner*—Minh Trinh
(74) *Attorney, Agent, or Firm*—Park, Vaughan & Fleming LLP

(57) ABSTRACT

The present invention relates to an apparatus that proactively ensures alignment (parallelism) of the connectors on the circuit board during the solder assembly of the connectors to the circuit board. The apparatus includes an alignment fixture that has been specifically designed to ensure parallelism of straddle-mounted connectors during the solder reflow assembly process. The fixture has connector slots and a circuit board slot. The slots help to detect whether the connectors meet the X- and Y-axis alignment requirements after the insertion process (after the connectors have been placed onto the circuit board). That is, if the X- and Y-axis alignment specifications are met, the circuit board with its attached connectors can be completely fitted into the slots of the alignment fixture. The fixture also contains a claw to control unintended connector displacements in the Z-axis, which may be caused by a circuit board warping under high temperature during the reflow process (the process to solder the connectors onto the circuit board). Thus, this apparatus provides a proactive approach for ensuring connectors alignment to the circuit board and reduces yield loss (and the number of reactive circuit board inspections); as a result, manufacturing costs are reduced.

15 Claims, 5 Drawing Sheets

FIG. 3
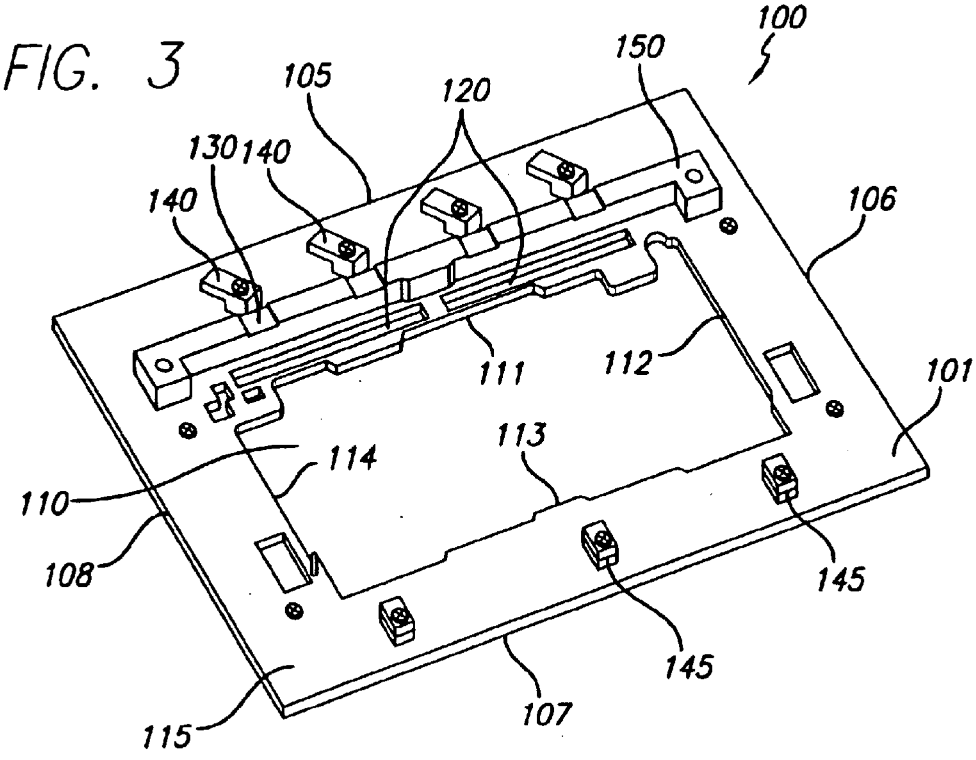
FIG. 4
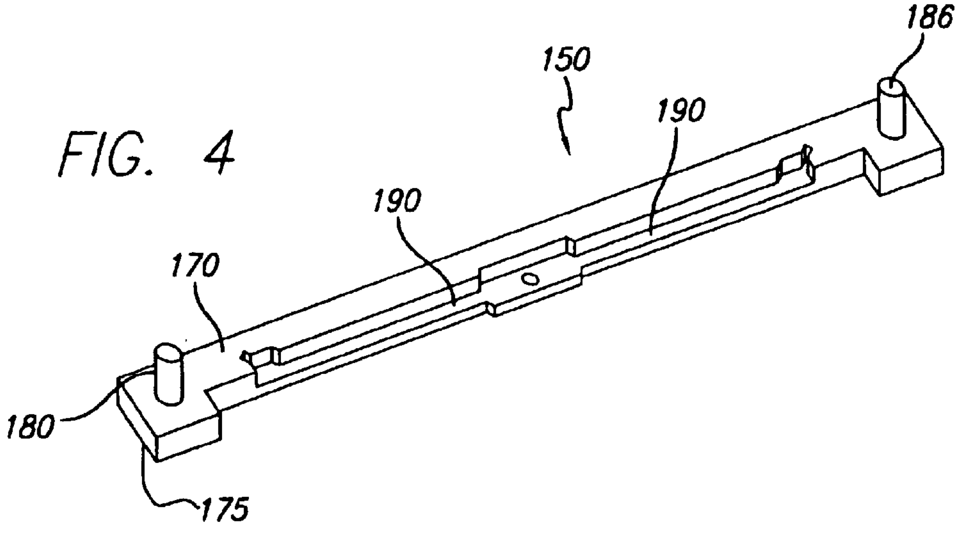
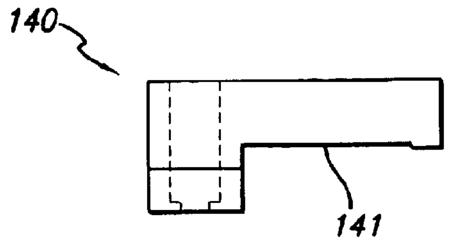
FIG. 5

APPARATUS FOR ALIGNING AND SOLDERING CONNECTORS TO A PRINTED BOARD

BACKGROUND OF THE INVENTION

1. Field of the Invention

The present invention relates generally to the mounting of electronic components on a printed circuit board. More particularly, the present invention relates to apparatus and methods for ensuring alignment (parallelism) of electrical connectors to a printed circuit board during an assembly process.

2. Description of Related Art

Most electronic systems include a printed circuit board with several electronic connectors connected to the circuit board. There are currently numerous electrical connectors available that can be mounted to a printed circuit board. For example, printed circuit boards are connected to cables or other mechanical or electrical mechanical parts of the electronic systems through straddle-mounted (or edge mounted) connectors. The straddle-mounted connectors are attached to an edge of a circuit board such that the connectors straddle or overlap opposing surfaces of the printed circuit board.

U.S. Pat. No. 5,199,855 discloses an example of a connector (trade name: MICTOR, manufactured by AMP Incorporated) that is typically mounted to the edge of the printed circuit board in a straddle-mount configuration. As shown in FIGS. 1–2, a Mictor connector 1 comprises two rows of leads 10 defining a space therebetween for receiving a circuit board 20. The leads 10 engage with conductive pads 30 formed on the circuit board 20 to establish electrical connection between the connector and the circuit board 20. A plurality of through holes are defined in the circuit board 20 proximated and spaced along an edge 25 of the circuit board 20 received in the space between the leads 10. Each through hole 40 has an inner plating electrically connected to a grounding path of the circuit board 20. The connector has a plurality of grounding pins 50 arranged in the space between the leads 10 for extending through the edge 25 of the circuit board 20 to intersect the corresponding through holes 40 to electrically engage the plating, thereby grounding the pins 50 to the circuit board 20. Typically, the leads 10 of the circuit board 20 are connected to the circuit board 20 through the use of solder 60. In addition, two standard size Mictor connectors are typically attached to a standard size circuit board.

Typically, straddle-mounted connectors are solder-connected to a circuit board using a reflow process. The reflow process allows for high volume component soldering in an efficient manner because the parts being soldered can be continuously run through a reflow oven. In practice, however, the conventional reflow assembly process for connecting the connectors to the circuit board is difficult to reproduce in a controllable manner and results in many electrical failures at the connectors of the circuit boards. As shown by connector example in FIGS. 1 and 2, these failures usually occur at the contact points of the straddle-mounted connectors and its corresponding circuit board (e.g., where the leads 10 engage the conductive pads 30) due to misalignment in either the X-direction 90, Y-direction 80 or Z-direction 70. The misalignment may occur during the insertion assembly process (e.g., not placing the connectors in the proper location on the circuit board) and/or the reflow assembly process (e.g., before the solder is re-solidified in the oven, the connectors on the circuit board can easily be displaced by external forces). Thus, in the conventional assembly process, the contact points between the circuit board and the connectors have to be inspected twice—once after the insertion process and again after the reflow process to ensure that the contact points have been properly aligned. Extra labors and associated costs due to these inspections are not minimal. Further, relying on inspection and measurement data to meet the alignment requirements is not a proactive approach to finding the root cause of the problem.

Accordingly, there is a need to provide for apparatus and methods that proactively ensure alignment (parallelism) of the connectors on the circuit board during the assembly process and thereby reduce assembly costs (e.g., reduce the number of reactive inspections and yield loss).

SUMMARY OF THE INVENTION

The present invention relates to apparatus and methods that proactively ensure alignment (parallelism) of connectors on a circuit board. The apparatus and methods include an alignment fixture that is adapted to ensure parallelism of the connectors on the circuit board during the solder reflow assembly process. In addition, this fixture helps to determine whether the connectors have been properly aligned on the circuit board after the connectors have been inserted (placed) onto the circuit board (after the insertion assembly process). The fixture also contains a claw to constrain connector displacements during the reflow assembly process. Thus, the present invention provides the important advantage of reducing circuit board assembly costs by proactively ensuring the alignment of the connectors on the circuit board during the assembly process.

In an embodiment of the invention, an apparatus for aligning and soldering connectors onto an edge of a printed circuit board includes a base having a top surface. The top surface has a slot. A first finger clamp is attached to the top surface of the base. The first finger clamp is located between a side of the base and a side of the slot. A claw is coupled to the top surface via the first finger clamp. The claw has a top claw side and a bottom claw side. The bottom claw side is adapted to constrain connectors onto the printed circuit board during a reflow assembly process. In addition, the slot is dimensioned to only house a printed circuit board having properly aligned connectors.

In another embodiment of the invention, an alignment fixture is constructed to include a slot, a claw and a first finger clamp. Connectors are inserted onto an edge of a printed circuit board. The circuit board is then transferred to the slot in the alignment fixture. The slot is dimensioned to fit only a circuit board having properly aligned connectors. The properly aligned circuit board is then fitted into the slot. The connectors are then constrained onto the circuit board with the claw. The claw is coupled to the alignment fixture via the first finger clamp. Using a reflow oven, the constrained connectors are then soldered onto the circuit board.

A more complete understanding of the present invention will be afforded to those skilled in the art, as well as a realization of additional advantages and objects thereof, by a consideration of the following detailed description of the embodiment. Reference will be made to the appended sheets of drawings, which will first be described briefly.

BRIEF DESCRIPTION OF THE DRAWINGS

The drawings illustrate the design and utility of embodiments of the invention. The components in the drawings are not necessarily to scale, emphasis instead being placed upon illustrating the principles underlying the embodiment.

Moreover, in the drawings, like reference numerals designate corresponding parts throughout the different views.

FIG. 3 is perspective view of an alignment fixture according to an embodiment of the invention;

FIG. 4 is a detailed perspective view of the bottom side of a claw on the alignment fixture of FIG. 3;

FIG. 5 is a detailed side view of a finger clamp on the alignment fixture of FIG. 3;

DETAILED DESCRIPTION

Figure 1:
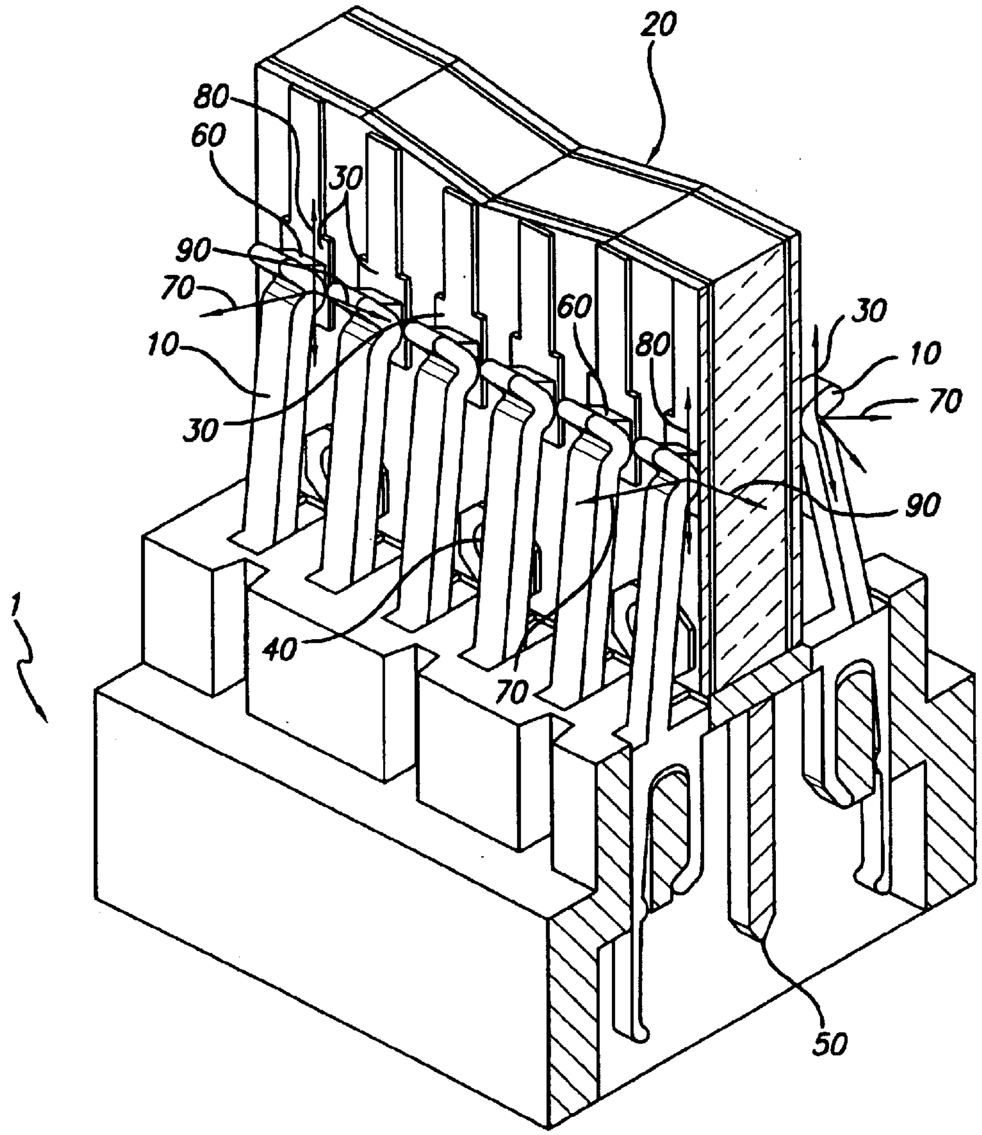
FIG. 1 PRIOR ART
FIG. 1 is a perspective cross sectional view of connectors on an edge of a printed circuit board.

The present invention provides apparatus and methods to proactively ensure alignment (parallelism) of straddle-mounted connectors on a circuit board during the assembly of the connectors to the circuit board. In accordance with the present invention, a fixture has been specifically designed to ensure parallelism of the straddle-mounted connectors during the solder reflow assembly process. The fixture helps to detect whether the connectors meet the X- and Y-axis alignment requirements after the insertion process (after the connectors have been placed onto the circuit board). That is, if the X- and Y-axis alignment specifications are met, the circuit board with its attached connectors can be completely fitted into the slots of the fixture. The fixture also contains a claw to control unintended connector displacements in the Z-axis, which may be caused by a circuit board warping under high temperature during the reflow process. Thus, this proactive approach for ensuring connectors alignment to the circuit board reduces yield loss (and the number of reactive circuit board inspections) and as a result, manufacturing costs are reduced.

For a better understanding of the invention, the following detailed description refers to the accompanying drawings wherein an exemplary embodiment of the present invention is illustrated and described.

An exemplary embodiment of an alignment fixture 100 according to the present invention is shown in FIGS. 3–5. As will be explained below, FIG. 3 is a perspective view of the alignment fixture 100 for aligning straddle-mounted connectors inserted on a circuit board. In this illustrated form, the alignment fixture 100 has a base 101. The base 101 is shown as having a substantially rectangular or square configuration with peripheral sides 105–108. The top surface 115 of the base 101 includes a claw 150, circuit board slot 110, and connector slots 120. The claw 150 has a top side 175 and a bottom side 170. The circuit board slot 110 is shown to have sides 111–114. The top surface 115 also includes finger clamps 140 located between side 105 of base 101 and side 111 of slot 110. Finger clamps 145 located between side 107 of base 101 and side 113 of slot 110 are also shown to be on the top surface 115. Circuit board slot 110 and connector slots 120 are dimensioned to only house a circuit board having properly aligned straddle-mounted connectors. The circuit board slot 110 and the connector slots 120 should be adapted to house a standard size circuit board having at least two standard size straddle-mounted Mictor connectors or other like connectors. Referring now also to FIG. 5, four indentations 130 are placed on the top side 175 of claw 150. Each of the indentation 130 is adapted to receive a corresponding finger portion 141 on each of the finger clamps 140. Finger clamps 145 are similarly constructed to include a finger portion (not shown) on each of the finger clamps 145. The finger portion on finger clamps 145 is adapted to constrain the circuit board housed in slot 110 by directly touching the circuit board.

Referring now to FIG. 4, the bottom side 170 of claw 150 is shown to have pins 180 extending out of the bottom surface 170 and connector notches 190 extending into the bottom surface. The connector notches 190 should be adapted to house at least two standard size straddle-mounted Mictor connectors inserted on a side of a standard size printed circuit board. The connector notches 190 are dimensioned to constrain the connectors onto the circuit board. Pins 180 are designed to be inserted into pin holes (not shown) on the top surface 115 of the fixture 100 to ensure that the claw 150 is placed in the proper location to constrain the connectors onto the circuit board after the circuit board is housed in slot 110 and slots 120. As shown in FIGS. 3 and 4, the pins can be constructed by stamping and friction fitting the pins into the claw 150. Pins 180 can also be constructed by other methods known in the art. For example, the pins 180 can be directly molded onto or curved out of the claw 150.

The fixture 100 should be constructed from material(s) having high heat tolerance. These heat resistant material(s) should be similar to those used to make the circuit board. More specifically, the fixture 100 should be constructed with FR4-high temperature material(s). FR4-high temperature material is an epoxy-resin-glass fiber material known to those skilled in the art.

Figure 6:
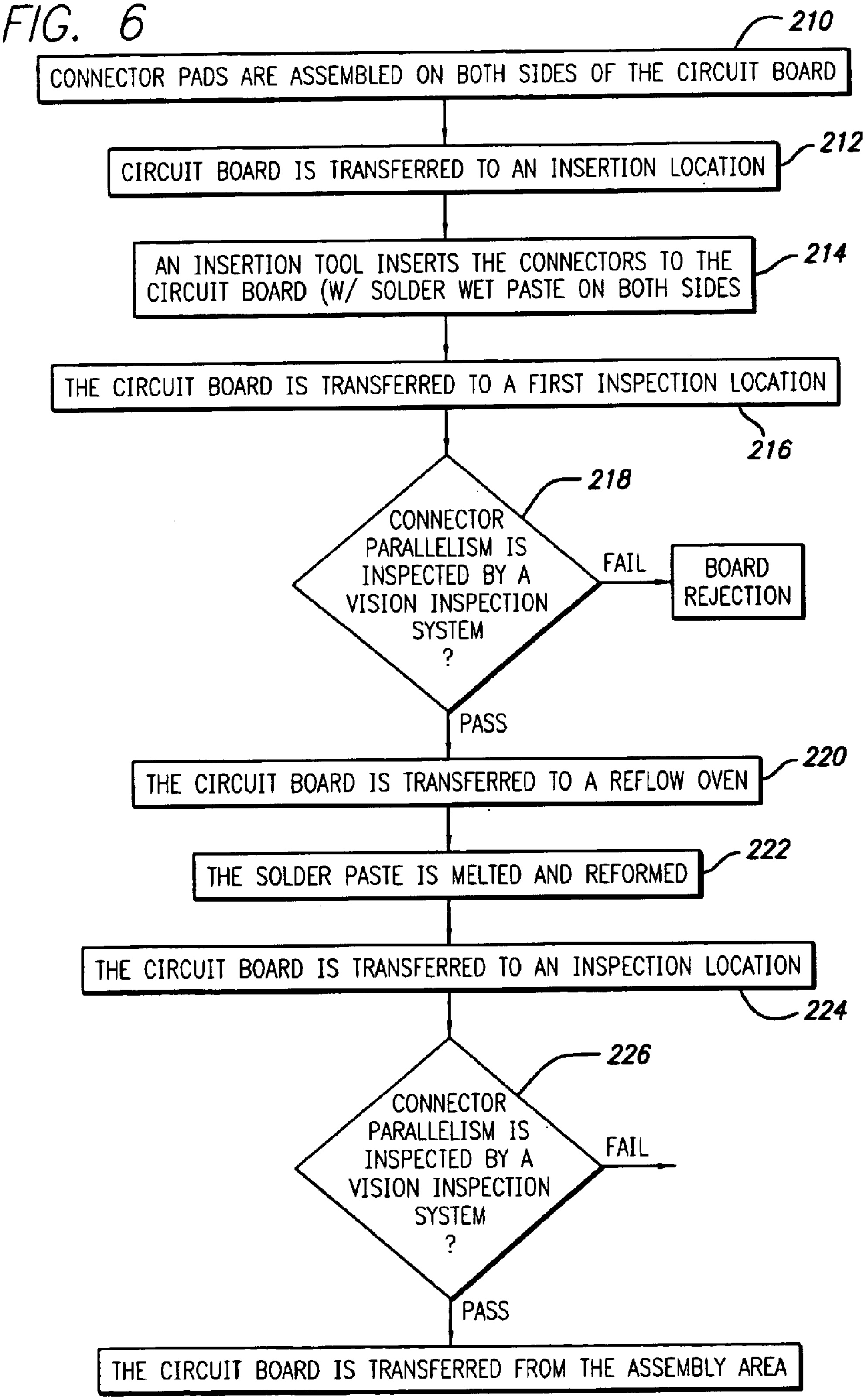
FIG. 6 is a flow chart illustrating a method of assembling connectors onto an edge of a printed circuit board.
Figure 7:
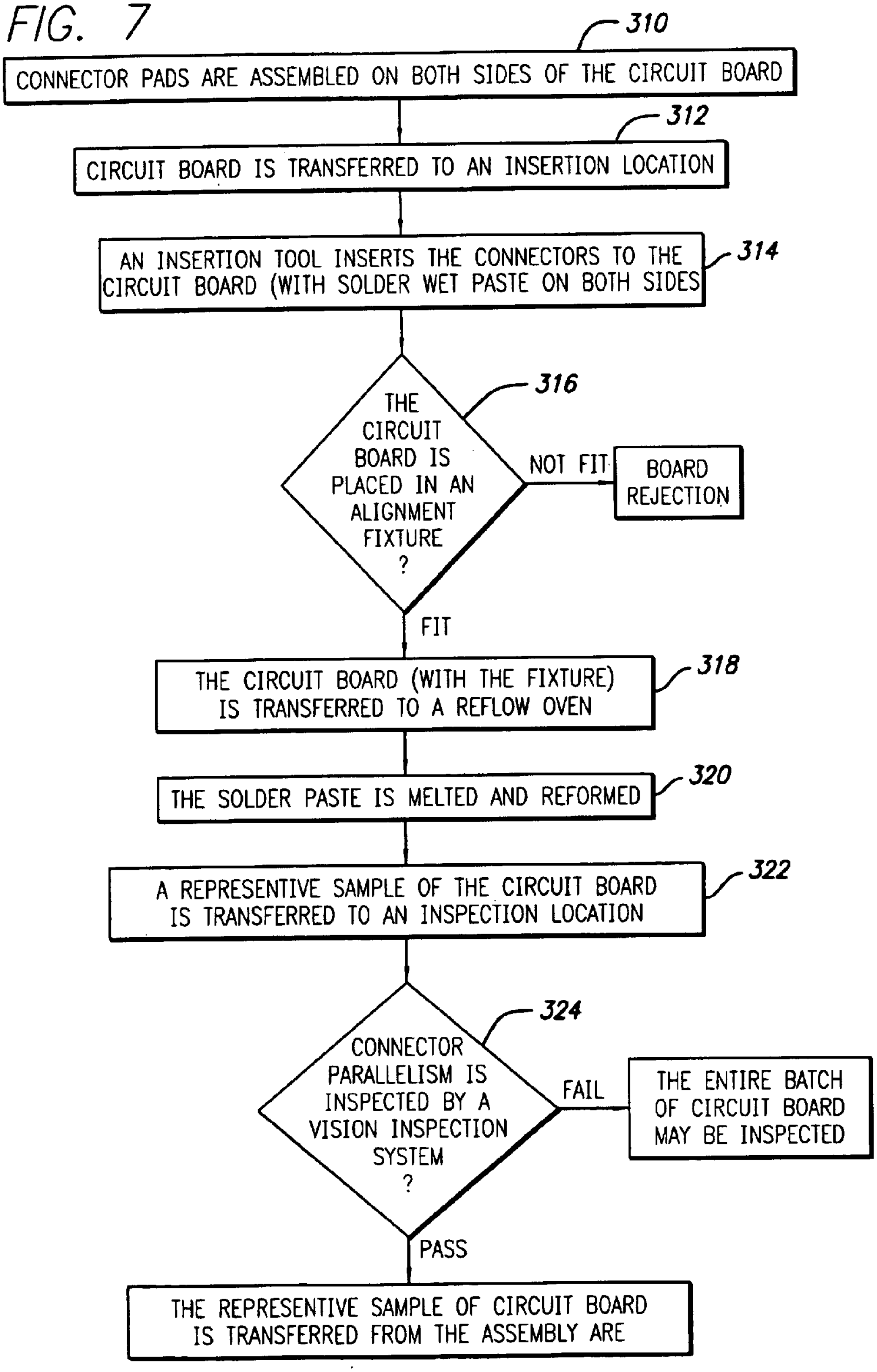
FIG. 7 is a flow chart illustrating another method of assembling connectors onto an edge of a printed circuit board according to an embodiment of the invention.

FIGS. 6–7 are flow charts that illustrate methods of assembling straddle-mounted connectors to a printed circuit board. The number set out in the parenthesis below refer to the steps of the flowchart illustrated in FIGS. 6–7.

Figure 2:
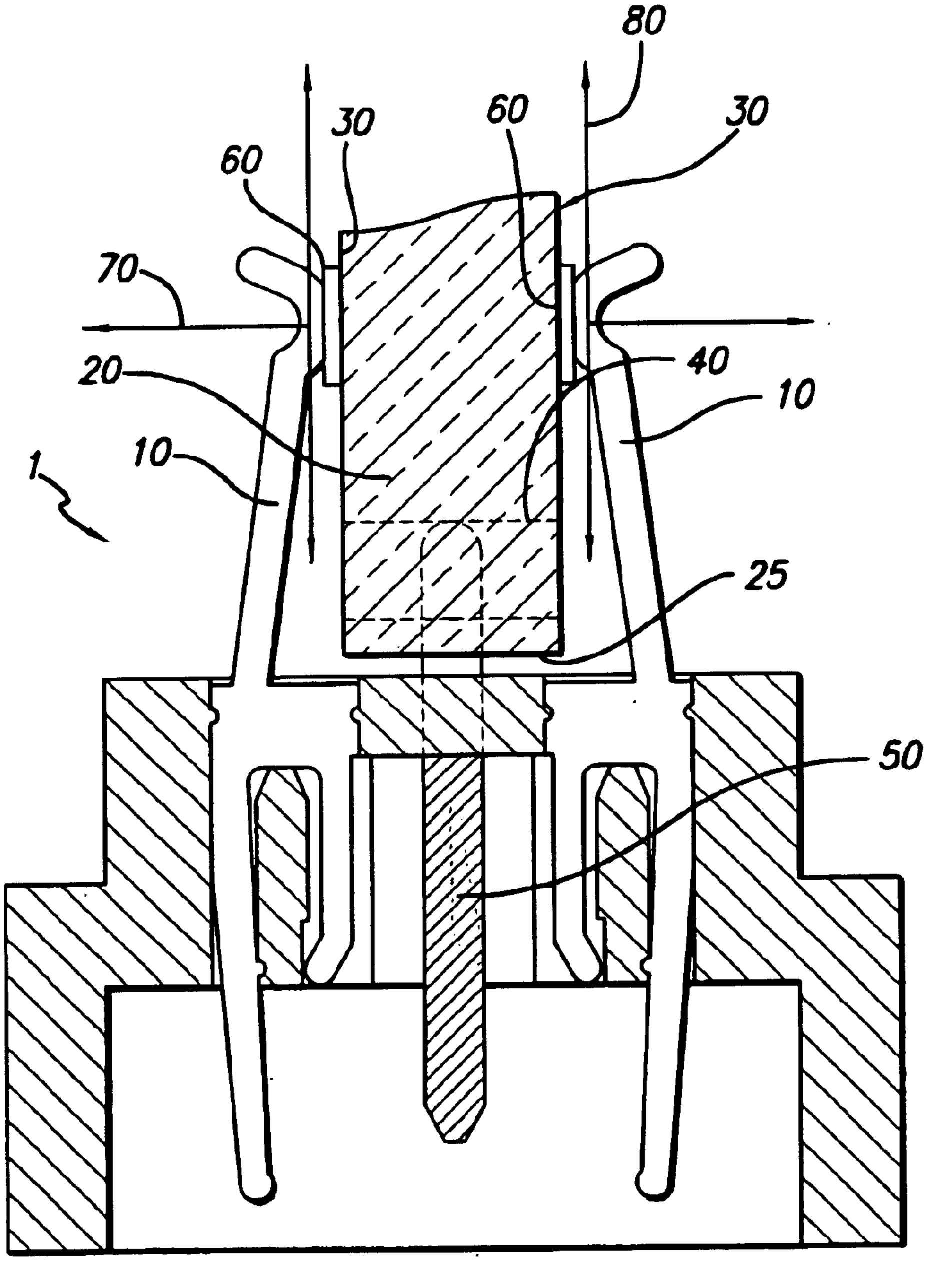
FIG. 2 PRIOR ART
FIG. 2 is cross sectional view showing the contact points of the connectors on the circuit board of FIG. 1.

Referring now to FIGS. 1–2 and 6, a printed circuit board 20 is provided with conductive connector pads 30 on both sides of the board 20 (210). Each of the pads 30 contains a predetermined amount of solder-paste 60. The solder-paste 60 should be Indium SMQ92C, and should be applied on the connect pads 30 using a screen-printer known to those skill in the art.

The board 20 is then transferred into an insertion location that is in the proximity of an insertion tool known to those skill in the art (212). The insertion tool inserts a predetermined number of straddle-mounted connectors 1 onto the circuit board 20 (214). Typically, two connectors 1 are inserted onto the circuit board 20.

After insertion, the board is transferred to a first inspection location (216). A vision inspection system known to those skill in the art determines if the connectors 1 are properly positioned (aligned) on the circuit board 20 (218). For example as shown in FIG. 1, to be properly aligned, the leads 10 on each of the connectors 1 should each be engaged with its corresponding connector pads 30 on the circuit board 20.

Referring now back to FIG. 6, after the connectors 1 have been determined to be properly placed on the circuit board, the circuit board 20 is transferred to a reflow oven (220). The reflow oven should be a convection-type oven known to those skilled in the art. The reflow oven melts (reflowed) and reformed (solidified) the solder-paste 60 on the connector pads 30 (222). As illustrated in FIG. 1, the reformed solder-paste 60 attaches the connector leads 10 with connector pads 30. The reflow oven should be set up with various heat zones, specifically about 10 heat zones for the top of the circuit board 20 and about 10 heat zones for the bottom of the circuit board 20. In addition, the circuit board 20 should be moved through the heat zones at a moving rate of about 35 inches per minute.

Referring still to FIG. 6, after exiting the reflow oven, the circuit board is transferred to a second inspection location and again inspected by a vision inspection system to determine if the connectors are properly positioned (aligned) on the circuit board (226). The misaligned circuit board(s) may be reworked by the apparatus and methods similar to those illustrated in U.S. Pat. No. 6,247,630, to Terry and Tran et al. and assigned Sun Microsystems, Inc. The entirety of U.S. Pat. No. 6,247,639 is incorporated by reference as if set forth fully herein. The removal and replacement of these connectors at this stage often result in extra labor, cost, less quality product, and worst of all, yield loss.

FIG. 7 illustrates an exemplary method of assembling straddle-mounted connectors to a printed circuit board according to an embodiment of the present invention. Similar to the FIGS. 1–2 and 6 embodiment, in this embodiment, a printed circuit board 20 has a plurality of connector pads 30 and solder-paste 60 on each of the pads (310). The board 20 (with the pads 30) is then moved into an insertion location (312). An insertion tool inserts the connectors onto the board (314). Rather than transferring the circuit board 20 to a first inspection location, the board is placed in an alignment fixture, as shown in FIGS. 3 to 5 (316). If the connectors 1 are properly inserted in the X-direction 90 and the Y-direction 80 after the insertion process (314), the board 20 and the inserted connectors 1 can be completely fitted into slot 110 and slots 120 of the fixture 100. On the other hand, if the board 20 does not fit, then it is rejected and has to be reworked. It should be noted that reworking at this stage (316) of the assembly process is less costly than reworking after the reflow process because the connectors have not be soldered onto the circuit board.

Once a properly aligned board has been fitted completely into slot 110 and slots 120 of the fixture 100, a claw 150 is placed on top of the connectors 1 and is held in place by clamps 140. The claw 150 is used to constrain the connectors 1 and the circuit board 20 within the fixture 100 (in the Z-axis 70). The area near the circuit board edge, opposing the circuit board edge inserted with the connectors 1, is then constrained within slot 110 (of the fixture 100) by clamps 145. The circuit board 20 and the fixture 100 are then both placed into the reflow oven where the solder-paste 60 on each of the connector pads 30 is reflowed (melted) and solidified (reformed) (318, 320). Accordingly, after the installation of the claw 150 onto the connectors 1 of the circuit board 20, the fixture 100 constrains the board 20 and its inserted connectors 1 from unintended X-axis 90, Y-axis 80, and Z-axis 70 displacements (or misalignments) that may result from a board 20 warping under high temperature during the reflow process (320). The constriction of the connectors 1 from unintended Y-axis 80 displacements is especially important because, unlike the displacements in the X-axis 90 that may constrained through the insertion of the grounding pins 50 into the edge 25 of circuit board 20, as illustrated in the FIGS. 1 and 2, the displacements in the Y-axis 80 are not constrained by the conventional grounding pins into a circuit board design.

In addition, because the connectors 1 are forcibly constrained onto the circuit board by the alignment fixture 100 in a properly aligned position, the alignment (parallelism) of the connectors 1 on the circuit board 20 may actually be improved. That is, any minor misalignment of the connectors 1 on the circuit board 20 are forcibly aligned by the alignment fixture 100 and this aligned position is permanently fixed by the soldering of the connectors onto the circuit board after the reflow process (318, 320). Thus, the use of the alignment fixture 100 not only prevents misalignment during the reflow process (318, 320), it actually improves the alignment of the connectors 1 onto the circuit board 20 during the reflow process (318, 320).

The reflowed (soldered) board may then be inspected individually. Because unintended misalignment of the inserted connectors from its circuit board are proactively constrained by the alignment fixture 100 and the alignment of the connectors may actually be improved during the reflow process, and because only properly aligned circuit board 20 after the insertion process (314) can fit into the fixture 100, board-by-board inspection of the circuit board 20 should not be necessary. Accordingly, a sampling method may be used to inspect only a representative sample of the soldered circuit board (324). A board-by-board inspection of the circuit board thus is eliminated resulting in further savings in labor and other costs.

Having thus described embodiments of the present invention, it should be apparent to those skilled in the art that certain advantages have been achieved. It should also be appreciated that various modifications, adaptations, and alternative embodiments thereof may be made within the scope and spirit of the present invention. For example, the aligning and soldering of straddle-mounted connectors onto an edge of a printed circuit board has been illustrated, but it should be apparent that the inventive concepts described above would be equally applicable to other types of connectors and surface mount devices. The invention is further defined by the following claims.

What is claimed is:

1. An apparatus for aligning and soldering connectors onto an edge of a printed circuit board, the apparatus comprising:

a base having a top surface, said top surface having a slot;

a first finger clamp attached to said top surface and located between a side of said base and a side of said slot; and a claw coupled to said top surface via said first finger clamp, said claw having a top claw side and a bottom claw side wherein said bottom claw side is adapted to constrain the connectors onto the printed circuit board during a reflow soldering process and wherein said slot is dimensioned to only house the printed circuit board when the connectors have been properly aligned to the printed circuit board.

2. The apparatus of claim 1, wherein said slot comprises a circuit board slot and a connector slot.

3. The apparatus of claim 2, wherein said circuit board slot and said connector slot are adapted to house a circuit board having at least two straddle-mounted connectors.

4. The apparatus of claim 1, wherein said first finger clamp has a finger portion.

5. The apparatus of claim 4, wherein said top claw side has a finger indentation for receiving said finger portion.

6. The apparatus of claim 1, wherein said first finger clamp comprises four finger clamps.

7. The apparatus of claim 1, further comprising a second finger clamp attached to said top surface and located between a second side of said base opposing the surface side nearest to said first clamp and a second side of said slot opposing the slot side nearest to said first clamp.

8. The apparatus of claim 7, wherein said second clamp comprises a finger portion adapted to be in direct contact with printed circuit board.

9. The apparatus of claim 1, wherein said bottom claw side comprises a plurality of claw pins.

10. The apparatus of claim 9, wherein said top surface comprises a plurality of pin holes adapted to receive said plurality of claw pins.

11. The apparatus of claim 1, wherein said bottom claw side comprises a notch adapted to house the connectors to be mounted on the edge of the printed circuit board.

12. The apparatus of claim 11, wherein said notch is adapted to house at least two straddle-mounted connectors.

13. The apparatus of claim 1, wherein said slot is dimensioned to constrain the connectors from Y-axis displacement during the soldering process.

14. The apparatus of claim 13, wherein said bottom claw side constrains the connectors from Z-axis displacement during a soldering process.

15. The apparatus of claim 1, wherein said apparatus is comprised of a heat resistant material comprising an epoxy-resin-glass fiber.

* * * * *

UNITED STATES PATENT AND TRADEMARK OFFICE

CERTIFICATE OF CORRECTION

PATENT NO. : 6,792,675 B2
DATED : September 21, 2004
INVENTOR(S) : Camnhung T. Tran It is certified that error appears in the above-identified patent and that said Letters Patent is hereby corrected as shown below:

Column 7,
Line 10, replace "with printed circuit board" with -- with the printed circuit board --.

Signed and Sealed this

Seventh Day of December, 2004

JON W. DUDAS
*Director of the United States Patent and Trademark Office*